United States Patent Office 3,355,428
Patented Nov. 28, 1967

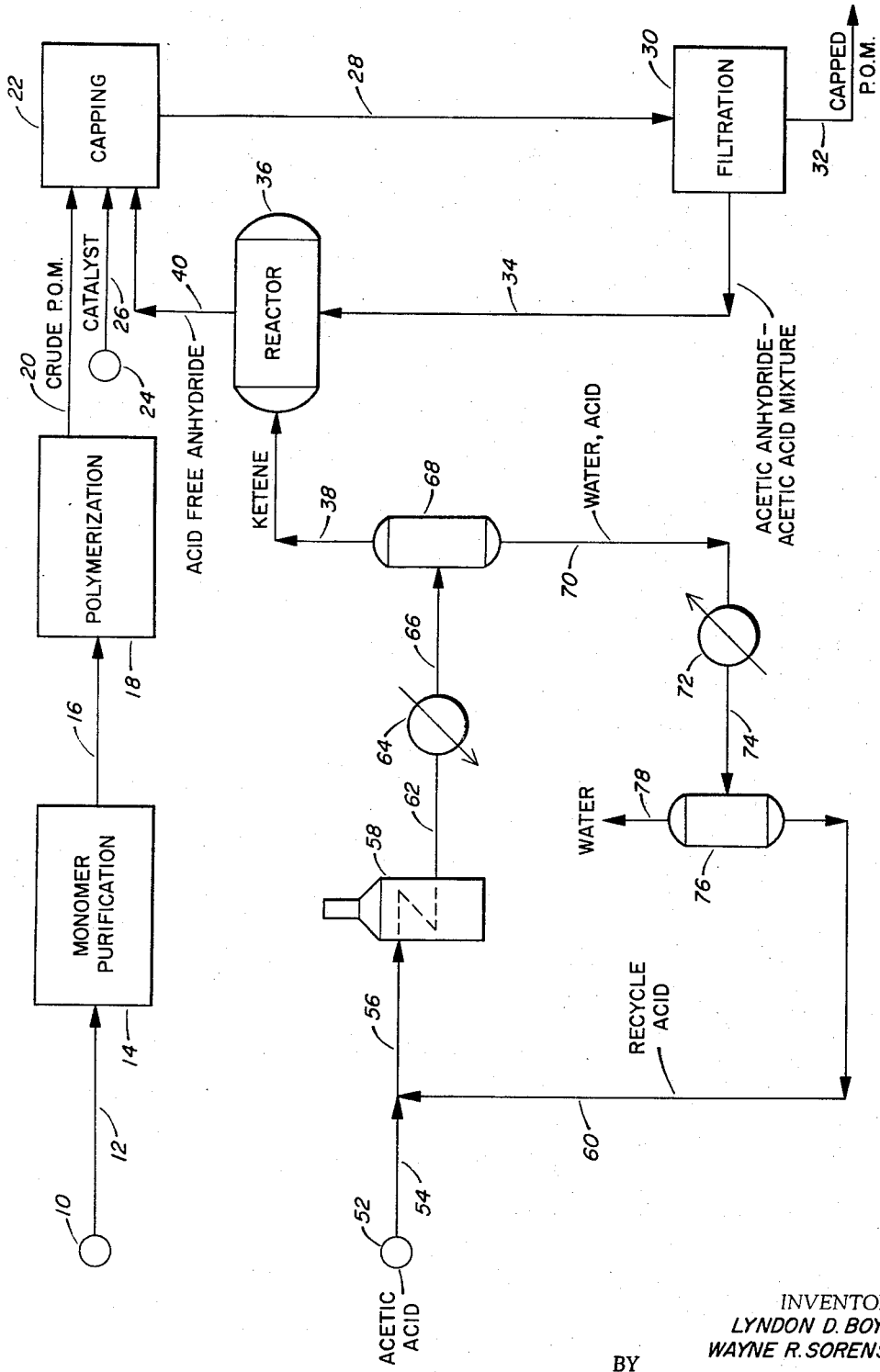

3,355,428
POLYOXYMETHYLENE PROCESS
Lyndon D. Boyer and Wayne R. Sorenson, Ponca City, Okla., assignors to Continental Oil Company, Ponca City, Okla., a corporation of Delaware
Filed Nov. 25, 1964, Ser. No. 413,879
11 Claims. (Cl. 260—67)

ABSTRACT OF THE DISCLOSURE

The terminal hydroxyl group of a polyoxymethylene chain is capped in a continuous process by reacting with excess acetic anhydride, removing capped polymer, reacting the spent capping mixture with ketene, and recycling.

Disclosure

This invention relates to stable polyoxymethylene polymers where one or both terminal groups have been capped with an acetate group. Specifically the invention relates to a combination process for preparing acetate capped polyoxymethylene polymers.

Polyoxymethylene polymers, sometimes called polyformaldehyde resins, are of importance in the synthetic resin field now. The early polymers tended to be unstable as evidenced by loss in average molecular weight. It was found that the presence of a hydroxyl group at one or both terminals of the linear polymer resulted in a source of weakness which permitted "unzipping" of the chain. This disability has been overcome by introducing a group at the terminal or terminals which resisted unzipping. The most common material for reaction with the free hydroxyl group or groups at the terminal or terminals of the polymers is acetic anhydride. The capping reaction requires the presence of an excess of acetic anhydride. The capping reaction produces a mole of acetic acid for each mole of anhydride reacted, resulting in a by-product solution mixture of acetic anhydride and acetic acid.

It is established that the characteristics of the polymer are affected by the presence of acetic acid during the capping reaction. Desirably not more than 0.5% acetic acid, and preferably not more than 0.05% should be present. In order to reuse the unreacted acetic anhydride present in the by-product solution mixture, it is necessary to remove the acetic acid content. At the present time, this is accomplished by distillation procedures, which procedures are not satisfactory both in acetic anhydride purity and cost of production.

The principal object of the invention is a polyoxymethylene process producing a stable polyoxymethylene acetate polymer, which process utilizes a more effective procedure for recovering the acetic anhydride-acetic acid solution mixture by-product of the capping operation.

Other objects of the invention will become apparent in the course of the detailed description thereof.

The sole figure, which forms a part of this specification, shows in substantially block diagram form one embodiment of the process of the invention.

The combination process of the invention comprises: (a) reacting a feed polyoxymethylene having at least one of the two terminals of the polyoxymethylene chain occupied by a hydroxyl group, with an excess of acetic anhydride, to form polyoxymethylene acetate and a solution mixture of acetic anhydride and acetic acid unsuitable for reaction with additional polyoxymethylene feed; (b) separating polyoxymethylene acetate from said solution mixture; (c) reacting solution mixture with ketene to convert acetic acid to essentially all acetic anhydride; and (d) cycling said acetic anhydride from (c) to the acetylation reaction (a).

The process of the invention is described in connection with the figure. The figure shows the purification of formaldehyde monomer for use in the polymerization operation and also the preparation of crude polymer (POM). It is to be understood that the process of the invention does not need to include these particular steps, but may begin directly with crude polyoxymethylene polymer having at least one of the two terminals of the polyoxymethylene chain occupied by a hydroxyl group.

In the figure aqueous formaldehyde solution, about 37% of formaldehyde, from source 10 is passed by way of line 12 into monomer purification zone 14. The object of monomer purification zone 14 is to produce a formaldehyde essentially free of water and impurities, which interfere with the production of high molecular weight polymer. Monomer purification can be carried out by any of those processes known to the art.

U.S. Patents Nos. 2,848,500 and 2,943,701 are directed to processes for the preparation of formaldehyde suitable for use in polyoxymethylene polymer preparation. The instant embodiment utilizes purification along the lines of these patents. Briefly, the formaldehyde solution is contacted with cyclohexanol to form a hemiformal. The contacting is carried out under conditions such that an essentially anhydrous hemiformal is removed as a distillation bottoms product.

The hemiformal is cracked at about 300° F. to split off the formaldehyde monomer. The formaldehyde is freed of alcohol and by-products in a series of cold traps. This formaldehyde monomer is essentially anhydrous and is free of impurities which tend to interfere with polymerization to the polyoxymethylene linear polymer.

The formaldehyde monomer is passed from zone 14 by way of line 16 to polymerization zone 18. Polymerization zone 18 may be operated at any of the conventional procedures for producing polymer of the desired molecular weight. Illustrative procedures are given in U.S. Patent No. 2,768,994 and British Patents Nos. 793,673 and 796,862.

Briefly, in this embodiment of the invention, polymerization is carried out in a two step continuous agitated pot reaction system utilizing 5 minute residence times, 150° F. temperature, atmospheric pressure and two p.p.m. of polymerization catalyst. A preferred polymerization catalyst is dimethyl di(hydrogenated tallow) ammonium acetate, where the hydrogenated tallow refers to a mixture of octadecyl and hexadecyl groups. The polymerization is carried out using heptane solvent in an amount such that the total reaction mass at the completion of the polymerization includes about 8% of polymer. The heptane solvent is removed to recover the crude polyoxymethylene which has at least one of the two terminals of the chain occupied by hydroxyl group.

Crude POM is passed by way of line 20 to capping (acetylation) zone 22. It is to be understood that the capping operation may be applied to crude polymer whether derived from solution or bulk polymerization procedures. The capping reaction is preferably carried out in the presence of a catalyst, such as sodium acetate, which is passed into zone 22 from source 24 by way of line 26. The capping agent is acetic anhydride.

The acetic anhydride capping agent preferably contains not more than 0.05% of acetic acid. However, for certain types of polymer, more than this amount of acetic acid impurity may be tolerated. Preferably, the acetic acid content is "zero." In order to carry out the capping reaction in a practical time, it is necessary that an excess of acetic anhydride be present over that required to react with the hydroxyl groups. In general, the acetic anhydride is present in the capping (acetylation reaction)

zone in an amount of about 3–25 parts by weight for each part of crude POM.

The acetic anhydride capping reaction and especially suitable catalysts therefor are described in U.S. Patent No. 2,964,500. Briefly, the acetylation reaction in this embodiment takes place in an agitated pot reactor, using 1 hour time, 285° F. temperature, atmospheric pressure, a weight ratio of acetic anhydride to crude POM of about 12 and sufficient sodium acetate catalyst to afford about 1½% in the total reaction mass. This ratio affords about 8% of polymer in the acetic anhydride. The crude POM to the capping reaction need not be entirely free of heptane solvent from zone 18.

The reaction mass is passed by way of line 28 to filtration operation 30 where the capped POM is recovered, and is sent to further purification by way of line 32. These purification procedures are well known to this art, for example, the residual acetic anhydride is removed by a combination of heat and vacuum extrusion. It is preferred that an anti-oxidant be introduced into the product polyoxymethylene, for example, one of those disclosed in U.S. Patent No. 2,966,476.

The acetic anhydride-acetic acid solution mixture from zone 30 is passed by way of line 34 into reactor 36. Ketene from line 38 is passed into reactor 36 where it reacts with acetic acid to produce acetic anhydride. Herein, reactor 36 is an agitated vessel operated at 200° F. and at atmospheric pressure. The contents of reactor 36 are maintained at reaction conditions for a period of time such that virtually all the acetic acid is converted, and there is passed to capping zone by way of line 40 acetic anhydride which has "zero" acetic acid content, i.e., within analytical determination.

The ketene is produced by thermal cracking of acetic acid. The production of ketene by cracking of acetic acid is well known. Typical processes are set out in U.S. Patents Nos. 2,483,883 and 2,856,426.

In this embodiment acetic acid from source 52 is passed by way of lines 54 and 56 into furnace 58. Recycle acid is passed by way of lines 60 and 56 into furnace 58. In furnace 58 acetic acid is brought to 1300° F. and is maintained for a time sufficient to obtain a 50% conversion of the acetic acid feed. At this conversion the cracking is essentially 100% selective for ketene product.

The mixture of ketene and acetic acid is passed from furnace 58 by way of line 62 into a quench vessel 64 where the temperature is reduced to 120° F. If desired, a further cooling to ambient temperature, for example, 60° F. may be carried out. The cooled mixture is passed by way of line 66 into a flash drum separator 68, where the ketene gas is taken overhead by way of line 38 to reactor 36.

The bottoms from flash drum 68 consisting essentially of acetic acid and water pass by way of line 70, heater 72 and line 74 into another flash drum 76. In flash drum 76 water vapor is taken overhead by way of line 78 and passed from the system. The acid bottoms from flash drum 76 is passed by way of lines 60 and 56 to furnace 58.

A cracking reaction of acetic acid to ketene of virtually 100% ultimate conversion can be obtained by correlating the temperature-time relation in furnace 58. It can be seen that this provides a very cheap source of acetic anhydride for use in the capping zone. The process eliminates entirely any need for physical separation of acetic acid from acetic anhydride. The difficulties of such a separation are self-evident when it is considered that typically the acetic anhydride-acetic acid mixture in line 34 will contain only about 0.1% of acetice acid. Indeed by the use of the acetic anhydride reactor 36 the process of this invention is enabled to operate with the virtually zero percent acetic acid in the acetic anhydride. The use of this extremely pure anhydride permits capping with essentially no degradation of the polymer.

In the process of the invention polyoxymethylene acetate polymer of average molecular weight, about 15,000–70,000 is readily made; in this embodiment an average molecular weight material of 50,000 is produced without difficulty.

The term "polyoxymethylene acetate polymer" is intended to include polymer having one or two terminal acetate groups resulting from the reaction of acetic anhydride with a terminal hydroxyl group.

Thus having described the invention, what is claimed is:

1. In a process for preparing stable polyoxymethylene wherein a feed polyoxymethylene having at least one of the two terminals of the polyoxymethylene chain occupied by a hydroxyl group is reacted with an excess of acetic anhydride to form polyoxymethylene acetate and a solution mixture of acetic anhydride and acetic acid unsuitable for reaction with additional polyoxymethylene feed, and wherein polyoxymethylene acetate is separated from said solution mixture, the improvement which comprises:
  (a) continuously reacting said solution mixture with ketene to convert acetic acid to essentially all acetic anhydride; and
  (b) cycling said acetic anhydride from (a) to the acetylation reaction without necessity of an intervening distillation.

2. The process of claim 1 wherein said polyoxymethylene feed has an average molecular weight of about 15,000–70,000.

3. The process of claim 1 wherein said acetic anhydride is present in the acetylation reaction (a) in about 3–25 parts by weight per part of said feed polyoxymethylene.

4. The process of claim 1 wherein said ketene reaction produces a cycle acetic anhydride containing not more than 0.05 of acetic acid.

5. The process of claim 1 wherein the ketene reacted in step (a) is produced by thermally cracking acetic acid.

6. In a process for preparing stable polyoxymethylene polymer wherein essentially pure formaldehyde is polymerized to form a liner polyoxymethylene polymer having at least one of the two terminals of the chain occupied by a hydroxyl group, said polymer is reacted with an excess of acetic anhydride in the presence of an acetylation catalyst to form polyoxymethylene acetate and a solution mixture of acetic anhydride and acetic acid unsuitable for reaction with additional polymer, and polyoxymethylene acetate is separated from said solution mixture, the improvement which comprises:
  (a) continuously reacting said solution mixture with ketene to convert acetic acid to essentially all acetic anhydride; and
  (b) cycling said acetic anhydride from (a) to the acetylation reaction without necessity of an intervening distillation.

7. The process of claim 6 wherein said polymerization step (1) is solution polymerization.

8. The process of claim 6 wherein said polymer has an average molecular weight of about 15,000–70,000.

9. The process of claim 6 wherein said acetic anhydride is present in the acetylation reaction (2) in about 3–25 parts by weight per part of said polymer.

10. The process of claim 6 wherein said ketene reaction produces a cycle acetic anhydride containing virtually no acetic acid.

11. The process of claim 6 wherein said formaldehyde has been obtained from an aqueous formaldehyde solution.

References Cited
UNITED STATES PATENTS

| | | | |
|---|---|---|---|
| 2,964,500 | 12/1960 | Jenkins et al. | 260—67 |
| 3,125,551 | 3/1964 | Punderson | 260—67 |
| 3,226,366 | 12/1965 | Bezzi et al. | 260—67 |

WILLIAM H. SHORT, *Primary Examiner.*

L. M. PHYNES, *Assistant Examiner.*